(12) United States Patent
Yang et al.

(10) Patent No.: US 12,356,253 B2
(45) Date of Patent: Jul. 8, 2025

(54) NETWORK SLICE MANAGEMENT METHOD, TERMINAL, AND COMPUTER READABLE STORAGE MEDIUM

(71) Applicant: ZTE CORPORATION, Shenzhen (CN)

(72) Inventors: Haicheng Yang, Shenzhen (CN); Dingyuan Tu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 458 days.

(21) Appl. No.: 17/906,215

(22) PCT Filed: May 21, 2021

(86) PCT No.: PCT/CN2021/095285
§ 371 (c)(1),
(2) Date: Sep. 13, 2022

(87) PCT Pub. No.: WO2021/254096
PCT Pub. Date: Dec. 23, 2021

(65) Prior Publication Data
US 2023/0119027 A1    Apr. 20, 2023

(30) Foreign Application Priority Data
Jun. 19, 2020 (CN) .......................... 202010564658.0

(51) Int. Cl.
*H04W 28/18* (2009.01)
*H04L 41/0897* (2022.01)
(Continued)

(52) U.S. Cl.
CPC ......... *H04W 28/18* (2013.01); *H04L 41/0897* (2022.05); *H04L 41/40* (2022.05); *H04W 48/18* (2013.01); *H04W 76/30* (2018.02)

(58) Field of Classification Search
CPC ..... H04W 28/18; H04W 76/30; H04W 48/18; H04L 41/0897; H04L 41/40
See application file for complete search history.

(56) References Cited

U.S. PATENT DOCUMENTS

| 10,070,344 B1 * | 9/2018 | Dowlatkhah | ......... H04W 28/16 |
| 2018/0324663 A1 | 11/2018 | Park et al. | |

(Continued)

FOREIGN PATENT DOCUMENTS

| CN | 106549806 A | 3/2017 |
| CN | 109391648 A | 2/2019 |
| WO | 2018000389 A1 | 1/2018 |

OTHER PUBLICATIONS

European Patent Office. Communication Pursuant to Article 94(3) EPC for EP Application No. 21825243.5, mailed Oct. 29, 2024, pp. 1-6.

(Continued)

*Primary Examiner* — Won Tae C Kim
(74) *Attorney, Agent, or Firm* — Vivacqua Crane, PLLC

(57) ABSTRACT

Disclosed are a network slice management method, a terminal device, and a non-transitory computer-readable storage medium. The network slice management method comprises: acquiring terminal operation information (S100); determining, according to the terminal operation information, a network slice to be released from network slices accessed by applications of the terminal (S200); and releasing the network slice to be released (S300).

17 Claims, 7 Drawing Sheets

(51) Int. Cl.
*H04L 41/40* (2022.01)
*H04W 48/18* (2009.01)
*H04W 76/30* (2018.01)

(56) References Cited

U.S. PATENT DOCUMENTS

| | | |
|---|---|---|
| 2019/0065275 A1 | 2/2019 | Wong et al. |
| 2019/0075552 A1 | 3/2019 | Yu et al. |
| 2020/0120721 A1* | 4/2020 | Lau ............... H04W 76/11 |
| 2021/0068044 A1* | 3/2021 | Chan ............. H04W 48/18 |

OTHER PUBLICATIONS

The State Intellectual Property Office of People's Republic of China. Second Office Action for CN Application No. 202010564658.0 and English translation, mailed Oct. 31, 2024, pp. 1-12.
International Searching Authority. International Search Report and Written Opinion for PCT Application No. PCT/CN2021/095285 and English translation, mailed Aug. 13, 2021, pp. 1-9.
European Patent Office. Extended European Search Report for EP Application No. 21825243.5, mailed Jun. 29, 2023, pp. 1-9.
The State Intellectual Property Office of People's Republic of China. First Office Action for CN Application No. 202010564658.0 and English translation, mailed Jun. 28, 2024, pp. 1-11.
The State Intellectual Property Office of People's Republic of China. First Search Report for CN Application No. 2020105646580 and English translation, mailed Jun. 25, 2024, pp. 1-4.

* cited by examiner

NETWORK SLICE MANAGEMENT METHOD, TERMINAL, AND COMPUTER READABLE STORAGE MEDIUM

CROSS-REFERENCE TO RELATED APPLICATION

This application is a national stage filing under 35 U.S.C. § 371 of international application number PCT/CN2021/095285, filed May 21, 2021, which claims priority to Chinese patent application No. 202010564658.0, filed Jun. 19, 2020. The contents of these applications are incorporated herein by reference in their entirety.

TECHNICAL FIELD

Embodiments of the present disclosure relate to, but are not limited to, the field of communications technologies, and in particular, to a network slice management method, a terminal device, and a non-transitory computer-readable storage medium.

BACKGROUND

As an important technology in 5G, network slicing enables an operator to create multiple virtual end-to-end networks on a common physical infrastructure. Network slices are logically isolated in terms of the terminal device, access network, transport network, and core network, providing tailored solutions to various services to meet different requirements of users. The 5G network with the network slicing technology can meet different customer needs in terms of functions such as priority, billing, policy control, security, and mobility, as well as performance such as latency, reliability, and data rate.

To meet a user's requirement for using the 5G network, after an application on a terminal device accesses a network slice, as long as the user does not close the application, the application will maintain the connection to the network slice even if the user switches the application to a background running mode without using the application for the moment. However, in the above application scenario, if a time-based charging policy is imposed on the network slice, the user will need to pay higher fees than the amount that should be charged for the actual duration of usage, which would adversely affect user experience.

SUMMARY

The following is a summary of the subject matters described in detail herein. This summary is not intended to limit the scope of the claims.

An embodiment of the present disclosure provides a network slice management method, a terminal device, and a non-transitory computer-readable storage medium.

In accordance with a first aspect, an embodiment of the present disclosure provides a network slice management method, including: acquiring operation information of a terminal device; determining, according to the operation information of the terminal device, a network slice to be released from network slices accessed by applications on the terminal device; and releasing the network slice to be released.

In accordance with a second aspect, a further embodiment of the present disclosure provides a terminal device, including: a memory, a processor, and a computer program stored in the memory and executable by the processor, where the processor, when executing the computer program, implements the network slice management method of the first aspect.

In accordance with a third aspect, a further embodiment of the present disclosure provides a non-transitory computer-readable storage medium, storing computer-executable instructions for performing the above-described network slice management method.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It should be noted that although a functional module division is shown in the schematic diagrams of the device and a logical order is shown in the flowcharts, the steps shown or described may be performed, in some cases, in a different module division from that of the device or in a different order from that in the flowcharts. The terms "first", "second", etc. in the description, the claims and the above-mentioned drawings are intended to distinguish between similar objects and are not necessarily to describe a specific order or sequence.

An embodiment of the present disclosure provides a network slice management method, a terminal device, and a non-transitory computer-readable storage medium. The terminal device acquires operation information of its own and can monitor the operation information of its own, such as an operation status of an application on the terminal device, a system operation status of the terminal device, and network connection quality of the terminal device. Then, the terminal device can determine, according to a working condition of the terminal device indicated by the operation information of the terminal device, a network slice to be released from among network slices accessed by applications on the terminal device, for example, determine a network slice accessed by an application currently not used by a user as a network slice to be released. Next, the terminal device releases the network slice to be released, to prevent the application currently not used by the user from still accessing the network slice. In this way, extra costs can be avoided in the case of a time-based charge with the network slice, thereby improving user experience.

The embodiments of the present disclosure will be further explained below with reference to the accompanying drawings.

Figure 1:
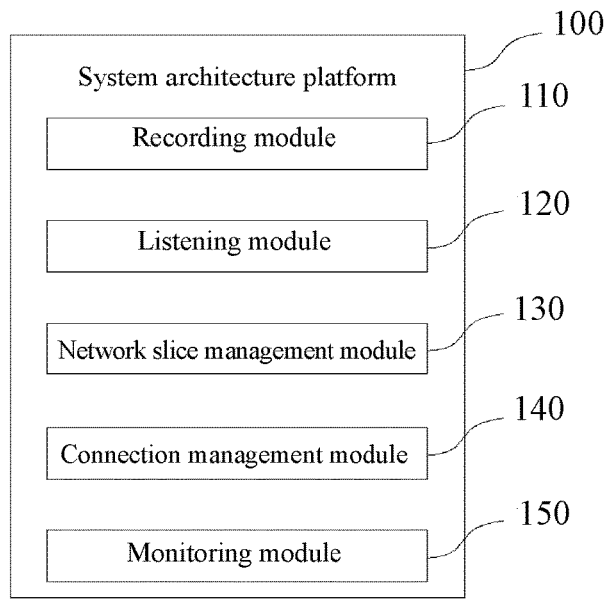
FIG. 1 is a schematic diagram of a system architecture platform for performing a network slice management method provided by an embodiment of the present disclosure.

FIG. 1 is a schematic diagram of a system architecture platform for performing a network slice management method provided by an embodiment of the present disclosure. In the example in FIG. 1, the system architecture platform 100 includes a recording module 110, a listening module 120, a network slice management module 130, a connection management module 140, and a monitoring module 150. Here, the recording module 110 is configured to record requesters and users of network slices, for example, applications requesting the network slices and applications using the network slices. The listening module 120 is configured to monitor whether an operation status of each application on the terminal device changes, and further monitor whether an operation status of a system of the terminal device changes. The network slice management module 130 is configured to request, maintain, and release a network slice. The connection management module 140 is configured to configure relevant network ports and routes for the applications. The monitoring module 150 is configured to monitor network quality information of network slices and a default network of the terminal device.

The system architecture platform 100 and an application scenario described in the embodiment of the present disclosure are for more clearly describing the technical schemes of the embodiments of the present disclosure, and do not constitute a limitation on the technical schemes provided by the embodiments of the present disclosure. Those of ordinary skill in the art may understand that, with evolution of the system architecture platform and emergence of new application scenarios, the technical schemes provided by the embodiments of the present disclosure are also applicable to similar technical problems.

Those of ordinary skill in the art may understand that a structure of the system architecture platform 100 shown in FIG. 1 does not constitute a limitation on the embodiments of the present disclosure and may include more or fewer components than illustrated, or combine some of the components, or use a different arrangement of the components.

In the system architecture platform 100 shown in FIG. 1, the recording module 110, the listening module 120, the network slice management module 130, the connection management module 140, and the monitoring module 150 may cooperate to implement the network slice management method.

Based on the structure of the system architecture platform, various embodiments of the network slice management method of the present disclosure are provided.

Figure 2:
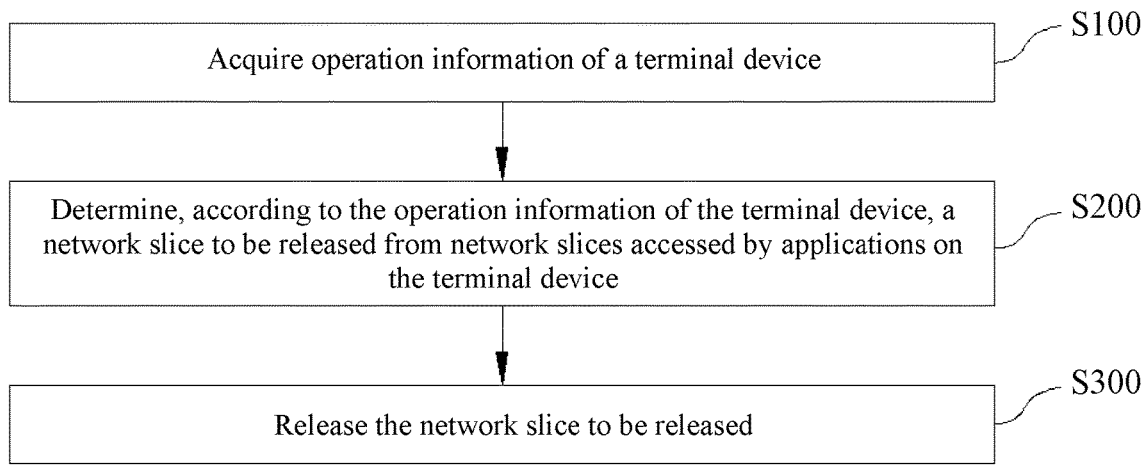
FIG. 2 is a flowchart of a network slice management method provided by an embodiment of the present disclosure.

FIG. 2 is a flowchart of a network slice management method provided by an embodiment of the present disclosure. The network slice management method includes, but is not limited to, steps S100, S200 and S300.

At step S100, operation information of a terminal device is acquired.

In an embodiment, when being in a working state, a terminal device can acquire the operation information of the terminal device, e.g. through a listening module in the terminal device, so that the operation information of the terminal device can be monitored, which provides a prerequisite for a subsequent step of releasing a network slice.

In an embodiment, the operation information of the terminal device refers to various types of information indicating a working condition of the terminal device, and may include but is not limited to an application operation status of each application on the terminal device, a system status of the terminal device, and network quality information of a connection between the terminal device and a network.

It is worth noting that before step S100 is performed, each application on the terminal device may request a corresponding network slice according to an actual situation. For example, when a user opens an application which needs to acquire data information from the network, the application will request a corresponding network slice. In an actual situation, applications on the terminal device may access their respective network slices, or multiple applications may access a common network slice, which is not specifically limited in this embodiment. In addition, after an application accesses a network slice, a recording module in the terminal device may store a requester or a user of the network slice. For example, the recording module may store an application name, an application identifier, and other related information of the application which accesses the network slice, to help the terminal device manage the network slice and the corresponding application. In addition, when an application requests access to a network slice, the terminal device will establish a Protocol Data Unit (PDU) session with a 5G network. After the terminal device establishes the PDU session with the 5G network, the corresponding application will be able to access the corresponding network slice and use a service provided by the network slice.

At step S200, a network slice to be released is determined from among network slices accessed by applications on the terminal device according to the operation information of the terminal device.

In an embodiment, a network slice to be released may be a network slice which is currently not needed for use or connection. After the operation information of the terminal device is acquired, the network slice to be released which is currently not needed for use or connection can be determined according to the operation information from among the network slices accessed by the applications on the terminal device. Therefore, the network slice to be released which is currently not needed for use or connection can be pertinently released in a subsequent step, and the application which is currently not used by the user is prevented from keeping accessing the network slice. In this way, extra costs can be avoided in the case of a time-based charge with the network slice, thereby improving user experience.

In an embodiment, there may be different implementations, depending on specific content of the operation information of the terminal device, for determining the network slice to be released from among the network slices accessed by the applications on the terminal device, which is not limited in this embodiment. For example, if the operation information of the terminal device includes an application operation status of each application on the terminal device, then, when the application operation status changes and indicates that a corresponding application is currently not needed for use by the user, a network slice accessed by the application can be determined as a network slice to be released. For another example, if the operation information of the terminal device includes a system status of the terminal device of the terminal device, then, when the system status of the terminal device changes and indicates that the user does not need to use the terminal device currently, all network slices currently accessed by the terminal device are determined as network slices to be released.

At step S300, the network slice to be released is released.

In an embodiment, after a network slice to be released is determined from among the network slices accessed by the applications on the terminal device, the network slice to be released can be released by a network slice management module in the terminal device to avoid extra costs caused by an application currently not used by the user still accessing the network slice. In this way, extra costs can be avoided in the case of a time-based charge with the network slice, thereby improving user experience. In addition, since the network slice which is currently not needed for use or connection can be released in time, large power consumption caused by continuous connection to the network slice by the terminal device can be avoided, thereby conserving energy for the terminal device.

In an embodiment, by using the network slice management method including steps S100, S200 and S300, the terminal device can monitor the operation information of the terminal device such as the operation status of each application, the system operation status of the terminal device, and the network connection quality of the terminal device. In this way, according to a working condition of the terminal device indicated by the operation information of the terminal device, a network slice to be released can be determined from among network slices accessed by the applications on the terminal device and released in time. In this way, the application which the user currently does not need to use is prevented from still accessing the network slice, thereby avoiding extra costs in the case of a time-based charge with the network slice, and improving user experience. In addition, since the terminal device can release, in a timely manner, the network slice that is currently not needed for use or connection, large power consumption caused by continuous connection to the network slice by the terminal device can be avoided, thereby conserving energy for the terminal device.

Figure 3:
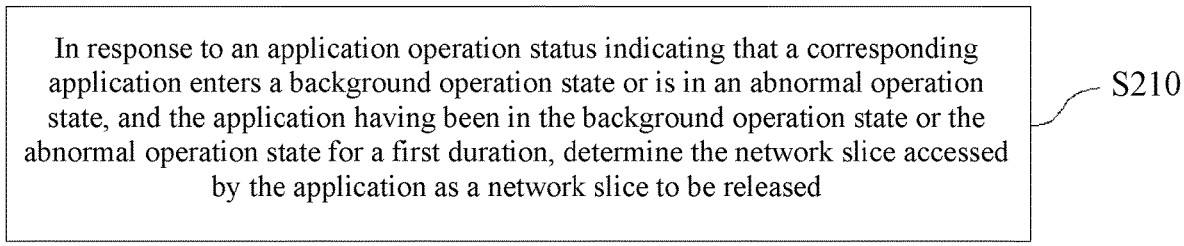
FIG. 3 is a flowchart of a network slice management method provided by another embodiment of the present disclosure.

Further, in an embodiment, referring to FIG. 3, when the operation information of the terminal device includes the application operation status, step S200 may include, but is not limited to, the following step.

At step S210, in response to the application operation status indicating that a corresponding application enters a background operation state or is in an abnormal operation state, and the application having been in the background operation state or the abnormal operation state for a first duration, a network slice accessed by the application is determined as a network slice to be released.

In an embodiment, when the application operation status indicates that a corresponding application enters a background operation state, and the application is in the background operation state for the first duration, it is indicated that the application entering the background operation state is not caused by a maloperation of the user, and instead, the user switches the application to the background operation state for the purpose of not using the application currently, that is, the user clearly expresses the intention of not using the application currently. Therefore, a network slice accessed by the application can be determined as a network slice to be released so that the network slice to be released can be released in a subsequent step. In this way, extra costs can be avoided in the case of a time-based charge with the network slice, thereby improving user experience. In addition, since the user does not need to use the application for the moment, releasing the network slice accessed by the application can avoid large power consumption of the terminal device caused by continuous connection to the network slice by the application, thereby conserving energy for the terminal device.

In an embodiment, when the application operation status indicates that a corresponding application is in an abnormal operation state, and the application is in the abnormal operation state for the first duration, it is indicated that the application is in an abnormal state from which the application cannot recover on its own in a short time, and therefore cannot re-provide the service to the user in a short time. If the application still accesses the network slice, it will cause the user to pay a fee without getting the corresponding service. Therefore, a network slice accessed by the application can be determined as a network slice to be released so that the network slice to be released can be released in a subsequent step. In this way, extra costs can be avoided in the case of a time-based charge with the network slice, thereby improving user experience. In addition, because the application cannot provide a service to the user successfully, releasing the network slice accessed by the application can avoid large power consumption of the terminal device caused by continuous connection to the network slice by the application, thereby conserving energy for the terminal device.

In an embodiment, the abnormal operation state of the application may include an application frozen state or an application not responding (ANR) error, etc., which is not specifically limited in this embodiment.

In an embodiment, the first duration may be set to a value appropriately selected according to an actual situation, which is not specifically limited in this embodiment. In addition, setting of the first duration can be realized by setting a timer or a stopwatch, which is also not specifically limited in this embodiment.

Figure 4:
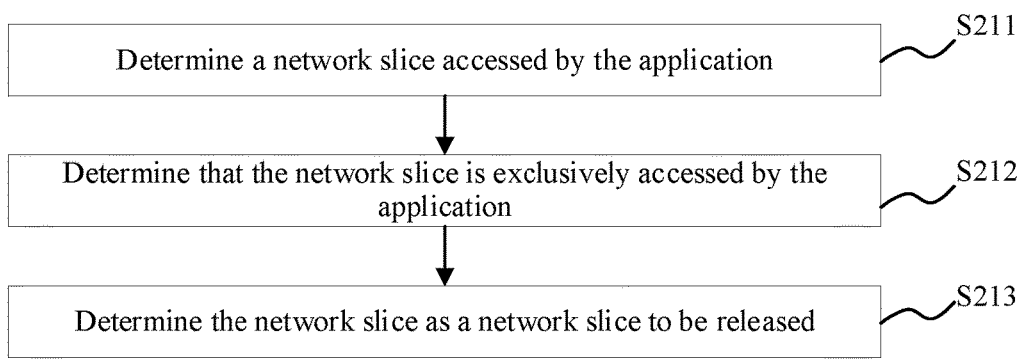
FIG. 4 is a flowchart of a network slice management method provided by another embodiment of the present disclosure.

Further, in an embodiment, referring to FIG. 4, the determining a network slice accessed by the application as a network slice to be released in step S210 may include but is not limited to the following steps.

At step S211, a network slice accessed by the application is determined.

At step S212, it is determined that the network slice is exclusively accessed by the application.

At step S213, the network slice is determined as a network slice to be released.

In an embodiment, when an application enters a background operation state or is in an abnormal operation state, and the application is in the background operation state or the abnormal operation state for a first duration, it is further needed to determine whether there is another application accessing the same network slice with the application. If there is any other application(s) also accessing the network slice accessed by the application, the network slice accessed by the application cannot be determined as a network slice to be released. If the network slice should be determined as a network slice to be released and then released, normal use of the other application(s) would be affected. Therefore, when the application operation status indicates that a corresponding application enters a background operation state or is in an abnormal operation state, and the application is in the background operation state or the abnormal operation state for the first duration, the network slice only accessed by the application is determined, from among network slices accessed by the applications on the terminal device, as a network slice to be released. Therefore, when the network slice to be released is released in a subsequent step, normal use of other application(s) is not affected, and extra costs can be avoided in the case of a time-based charge with the network slice, thereby improving user experience.

It is worth noting that in the case in which there is another application also accessing the network slice accessed by the application, as the application is in the background operation state or in the abnormal operation state for the first duration, extra costs will occur if access of the application to the network slice is still maintained. In view of this, the application can be switched to accessing a default network of the terminal device, to avoid extra costs in the case of a time-based charge with the network slice, so that user experience can be improved.

Further, in an embodiment, when the operation information of the terminal device includes the system status of the terminal device, step S200 may further include, but is not limited to, the following step:

in response to the system status of the terminal device indicating that the terminal device enters a sleep mode, determining that all network slices accessed by the applications on the terminal device are network slices to be released.

In an embodiment, when the system status of the terminal device indicates that the terminal device has entered a sleep mode, it is indicated that the user does not use the terminal device currently, that is, the user currently does not need the applications on the terminal device to provide any service for the user. Therefore, all network slices accessed by the applications on the terminal device may be determined as network slices to be released, so that the network slices to be released can be released in a subsequent step. In this way, extra costs can be avoided in the case of a time-based charge with the network slice, thereby improving user experience. In addition, since the terminal device has entered the sleep mode, that is, the terminal device has entered a power saving mode, releasing the network slices accessed by the applications can avoid large power consumption of the terminal device caused by continuous connection to the network slice by the applications, thereby conserving energy for the terminal device.

Further, in an embodiment, when the operation information of the terminal device includes first network quality information corresponding to a network slice and second network quality information corresponding to the default network of the terminal device, step S200 may further include, but is not limited to, the following step:

in response to the second network quality information keeping being superior to the first network quality information for a second duration, determining, from among the network slices accessed by the applications on the terminal device, the network slice corresponding to the first network quality information as a network slice to be released.

In an embodiment, after the terminal device accesses a network, a monitoring module in the terminal device will monitor the network quality information of the connection between the terminal device and the network, for example, monitor the second network quality information of the connection between the terminal device and the default network of the terminal device. The default network of the terminal device is determined according to network types supported by the terminal device and a default network type set by the user. For example, if the network types supported by the terminal device include 3G network, 4G network, and 5G network, and the default network type set by the user is 4G network, then the default network of the terminal device is 4G network. In addition, when the application on the terminal device accesses a network slice, the monitoring module also monitors the first network quality information of the connection between the terminal device and the network slice. When the second network quality information is superior than the first network quality information for the second duration, it is indicated that quality of a connection between the terminal device and the network slice is poor. In this case, if access of the application to the network slice is still maintained, it may affect user experience, which is specifically reflected in a low network transmission speed, disconnection, network access failure, or the like. Therefore, to avoid affecting the user experience with the application, the network slice corresponding to the first network quality information is determined from among the network slice accessed by the applications on the terminal device as a network slice to be released, so that the network slice to be released can be released in a subsequent step. However, to ensure normal use of the application by the user, after releasing the network slice to be released, the application can be switched to accessing the default network of the terminal device, so that on the basis of ensuring normal use of the application by the user, extra fees can be avoided in the case of a time-based charge with the network slice, and user experience is improved.

In an embodiment, both the first network quality information and the second network quality information may include but are not limited to performance indicators such as latency, reliability, and data rate. The first network quality information and the second network quality information may be evaluated and compared against each other based on an overall analysis of various performance indicators, thereby providing a prerequisite for whether to release a network slice subsequently.

In an embodiment, the second duration may be set to a value appropriately selected according to an actual situation, which is not specifically limited in this embodiment. In addition, setting of the second duration can be realized by setting a timer or a stopwatch, which is also not specifically limited in this embodiment.

Further, in an embodiment, the network slice management method may further include but is not limited to the following step:

switching an application, which accesses the network slice to be released, accessing the default network of the terminal device.

In an embodiment, after a network slice to be released is determined according to the operation information of the terminal device from among the network slices accessed by the applications on the terminal device, to avoid impact on normal use of an application accessing the network slice to be released, the application accessing the network slice to be released can be switched to accessing the default network of the terminal device, so that service data of the application is carried by the default network of the terminal device, thereby ensuring that the application can normally provide a service for the user. It is worth noting that, when performing the step of switching the application accessing the network slice to be released to accessing the default network of the terminal device in this embodiment, a connection management module in the terminal device reconfigures a network port and a related route for the application, so that the application can access the default network of the terminal device.

In an embodiment, the step of switching the application accessing the network slice to be released to accessing the default network of the terminal device may be executed at different timings, for example, may be executed before step S300 or synchronously with step S300 in the foregoing embodiment, which is not limited in this embodiment. When the step of switching the application accessing the network slice to be released to accessing the default network of the terminal device in this embodiment is executed before step S300, the network slice to be released and the default network of the terminal device may both carry the service data of the application. Therefore, when the network slice to be released is released in step S300, normal use of the application is not affected, achieving an effect of seamlessly switching between networks carrying the service data of the application. When the step of switching the application accessing the network slice to be released to accessing the default network of the terminal device in this embodiment is executed synchronously with step S300, the application may be made to continue providing a service to the user normally in the process of switching between networks carrying the service data of the application, to avoid impact on user experience.

Further, in an embodiment, in a case that the application enters the background operation state or is in the abnormal operation state and therefore the network slice accessed by the application is released, the network slice management method may further include but is not limited to the following step:

in response to the application exiting the background operation state or exiting the abnormal operation state, re-requesting access to the network slice for the application.

In an embodiment, when the application exits the background operation state, it is indicated that the user is currently using the application, and therefore, access to the network slice may be re-requested for the application, so that the application can provide a 5G network service for the user; and when the application exits the abnormal operation state, it is indicated that the application resumes normal operation and can continue to provide a service for the user, and therefore, access to the network slice may be re-requested for the application, so that the application can provide a 5G network service for the user.

It is worth noting that, when re-requesting access to the network slice for the application, the network slice management module in the terminal device first requests the network slice for the application from the network, and then the connection management module in the terminal device reconfigures a network port and a related route for the application, so that the application can access the requested network slice.

Figure 5:
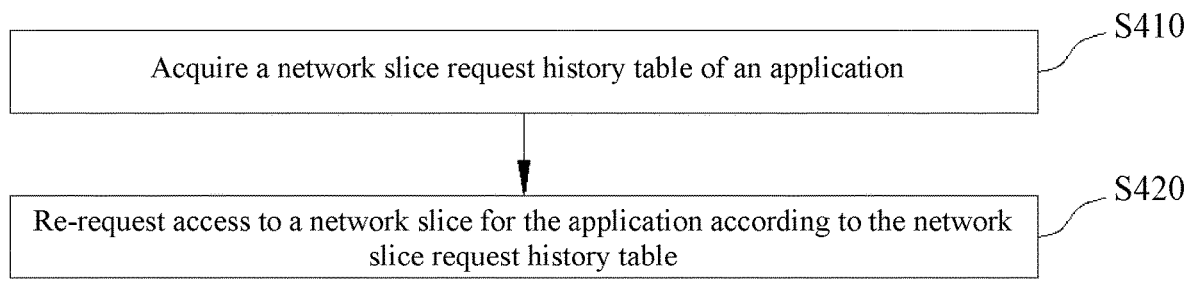
FIG. 5 is a flowchart of a network slice management method provided by another embodiment of the present disclosure.

Further, in an embodiment, referring to FIG. 5, re-requesting access to the network slice for the application includes but is not limited to the following steps.

At step S410, a network slice request history table of the application is acquired.

At step S420, access to the network slice is re-requested for the application according to the network slice request history table.

In an embodiment, after the application successfully accesses the network slice, the recording module in the terminal device will store a requester or a user of the network slice, for example, store an application name, an application identifier, and other related information of the application accessing the network slice. Therefore, the recording module may establish a network slice request history table according to the network slice successfully accessed by the application, not only facilitating management of the network slice, but also facilitating subsequent reapplication of the network slice.

In an embodiment, the network slice request history table records relevant information of network slices to which the applications on the terminal device once requested access, and information such as requesters or users of the network slices. Therefore, when it is necessary to re-request access to the network slice for an application, the network slice request history table maintained by the recording module can be used to re-request access to the network slice for the application, thereby improving efficiency of requesting the network slice. A specific example is used here for illustration. When it is necessary to re-request access to the network slice for an application, the recording module may be first searched for a network slice request history table including information about a network slice to which the application once requested access. Then, the network slice management module is controlled to request, according to the network slice request history table, from the network for access to the network slice for the application.

It is worth noting that when access to a network slice is re-requested for the application according to the network slice request history table, relevant information of network slices that were once accessed by the application may be selected from the network slice request history table in sequence for subsequent requesting to the network for a corresponding network slice. Alternatively, relevant information of a network slice which satisfies a current transmission quality requirement of the application may be first selected from the network slice request history table for subsequent requesting to the network for a corresponding network slice. This is not specifically limited in this embodiment.

The following provides specific examples to more clearly describe specific steps of the network slice management method in the above embodiments.

Example I

Figure 6:
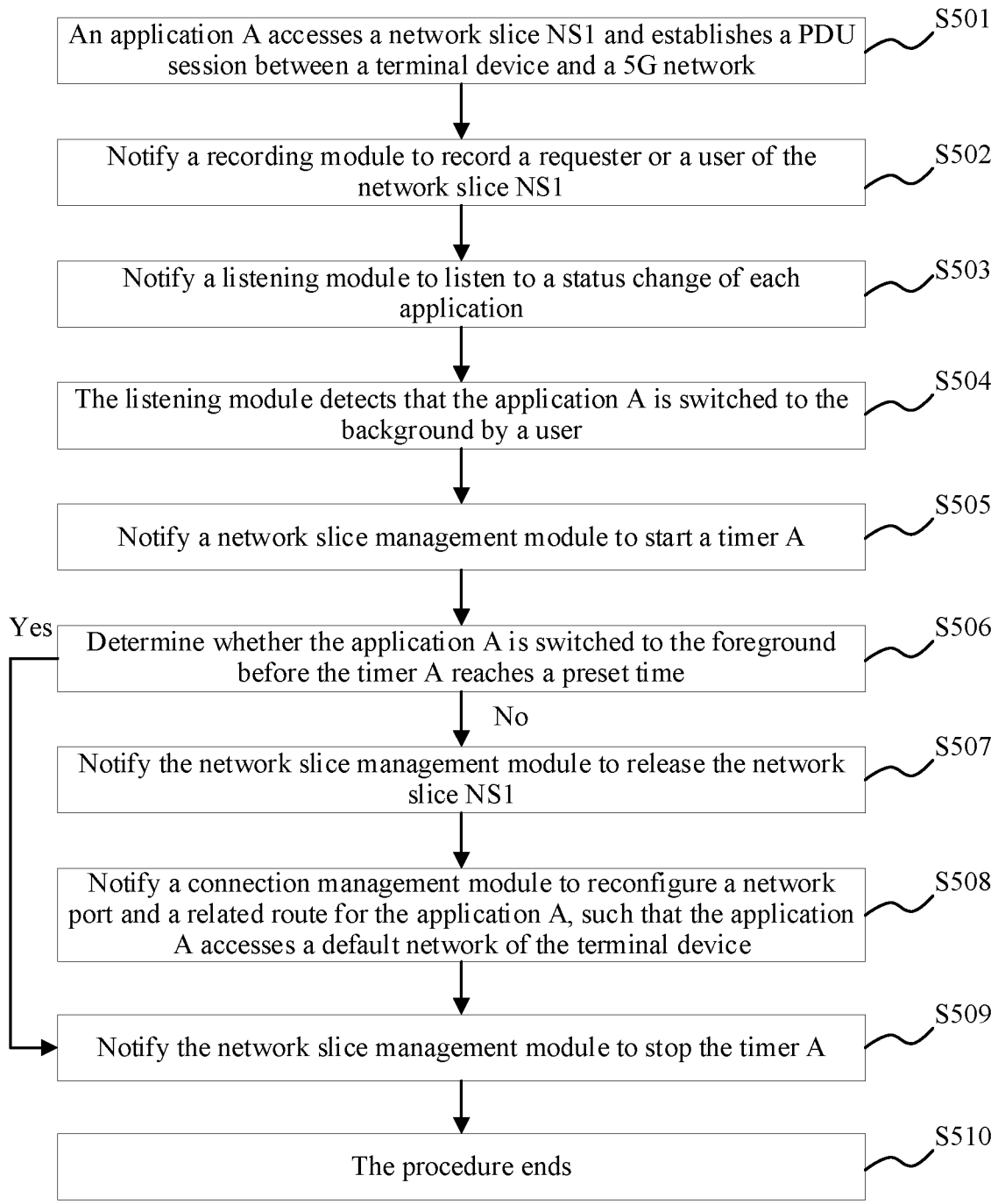
FIG. 6 is a flowchart of a network slice management method provided by another embodiment of the present disclosure.

FIG. 6 is a flowchart of a network slice management method for a single application provided by a specific example of the present disclosure. The network slice management method is used in a terminal device, and the network slice management method includes the following steps.

At step S501, an application A accesses a network slice NS1 and establishes a PDU session between the terminal device and a 5G network.

At step S502, a recording module is notified to record a requester or a user of the network slice NS1.

At step S503, a listening module is notified to listen to a status change of each application.

At step S504, the listening module detects that the application A is switched to the background by a user.

At step S505, a network slice management module is notified to start a timer A.

At step S506, it is determined whether the application A is switched to the foreground before the timer A reaches a preset time. If the application A is not switched to the foreground before the timer A reaches the preset time, the procedure proceeds to step S507. If the application A is switched to the foreground before the timer A reaches the preset time, the procedure proceeds to step S509.

At step S507, the network slice management module is notified to release the network slice NS1.

At step S508, a connection management module is notified to reconfigure a network port and a related route for the application A, such that the application A accesses a default network of the terminal device.

At step S509, the network slice management module is notified to stop the timer A.

At step S510, the procedure ends.

Example II

Figure 7:
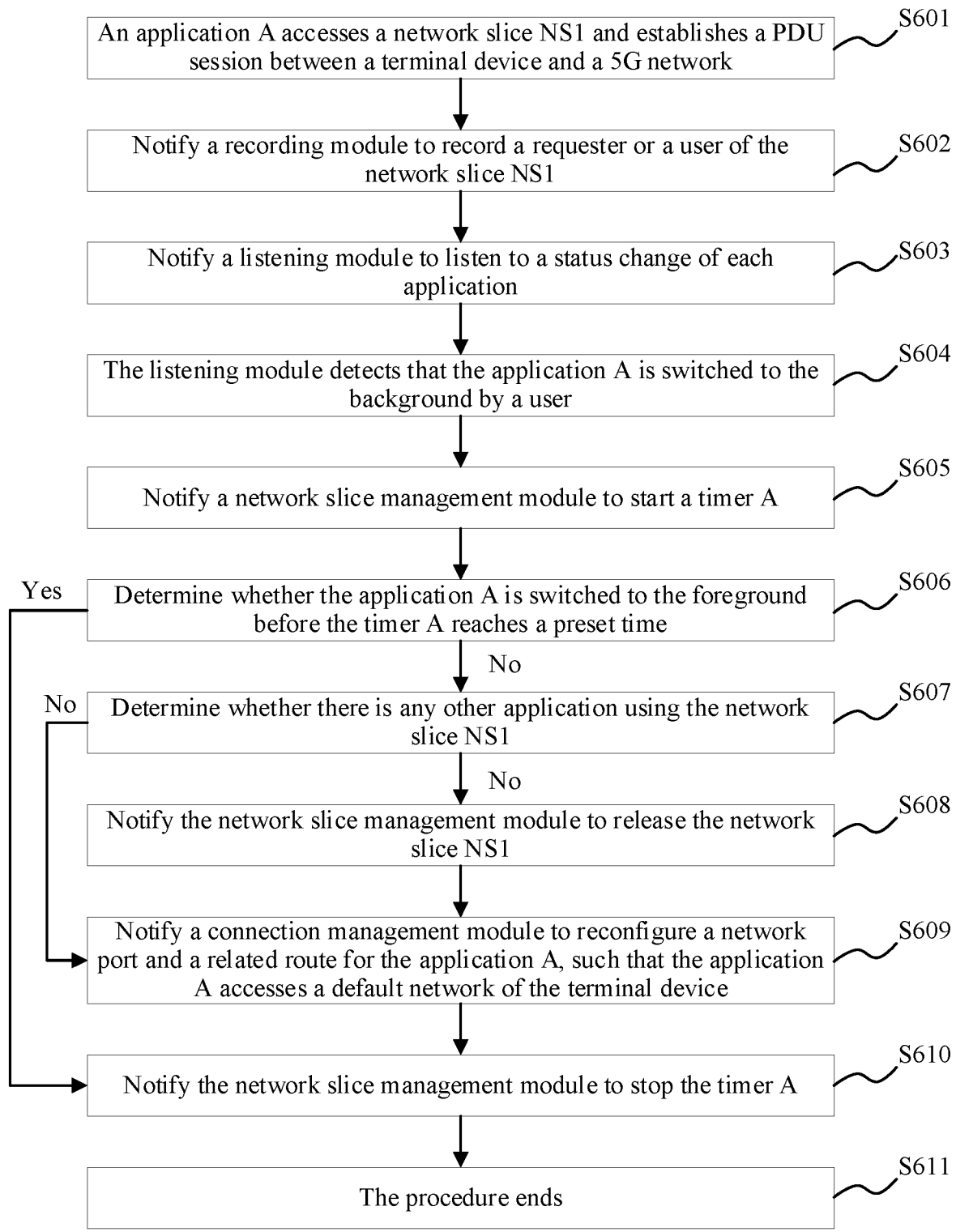
FIG. 7 is a flowchart of a network slice management method provided by another embodiment of the present disclosure.

FIG. 7 is a flowchart of a network slice management method for multiple applications provided by another specific example of the present disclosure. The network slice management method is used in a terminal device, and the network slice management method includes the following steps.

At step S601, an application A accesses a network slice NS1 and establishes a PDU session between the terminal device and a 5G network.

At step S602, a recording module is notified to record a requester or a user of the network slice NS1.

At step S603, a listening module is notified to listen to a status change of each application.

At step S604, the listening module detects that the application A is switched to the background by a user.

At step S605, a network slice management module is notified to start a timer A.

At step S606, it is determined whether the application A is switched to the foreground before the timer A reaches a preset time. If the application A is not switched to the foreground before the timer A reaches the preset time, the procedure proceeds to step S607. If the application A is switched to the foreground before the timer A reaches the preset time, the procedure proceeds to step S610.

At step S607, it is determined whether there is any other application using the network slice NS1. If there are no other applications using the network slice NS1, the procedure proceeds to step S608. If there is other application(s) using the network slice NS1, the procedure proceeds to step S609.

At step S608, the network slice management module is notified to release the network slice NS1.

At step S609, a connection management module is notified to reconfigure a network port and a related route for the application A, such that the application A accesses a default network of the terminal device.

At step S610, the network slice management module is notified to stop the timer A.

At step S611, the procedure ends.

Example III

Figure 8:
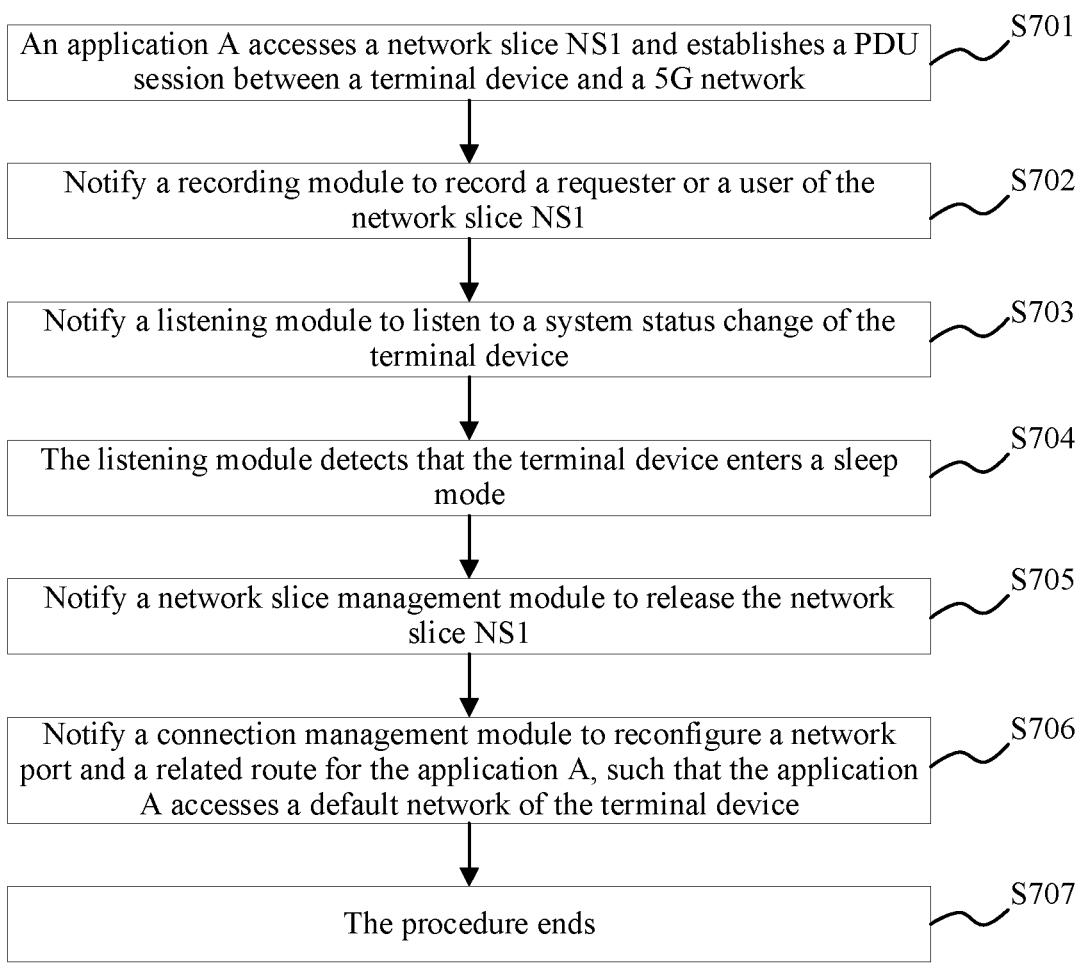
FIG. 8 is a flowchart of a network slice management method provided by another embodiment of the present disclosure.

FIG. 8 is a flowchart of a network slice management method directed at a system status of a terminal device provided by another specific example of the present disclosure. The network slice management method is used in a terminal device, and the network slice management method includes the following steps.

At step S701, an application A accesses a network slice NS1 and establishes a PDU session between the terminal device and a 5G network.

At step S702, a recording module is notified to record a requester or a user of the network slice NS1.

At step S703, a listening module is notified to listen to a system status change of the terminal device.

At step S704, the listening module detects that the terminal device enters a sleep mode.

At step S705, a network slice management module is notified to release the network slice NS1.

At step S706, a connection management module is notified to reconfigure a network port and a related route for the application A, such that the application A accesses a default network of the terminal device.

At step S707, the procedure ends.

Example IV

Figure 9:
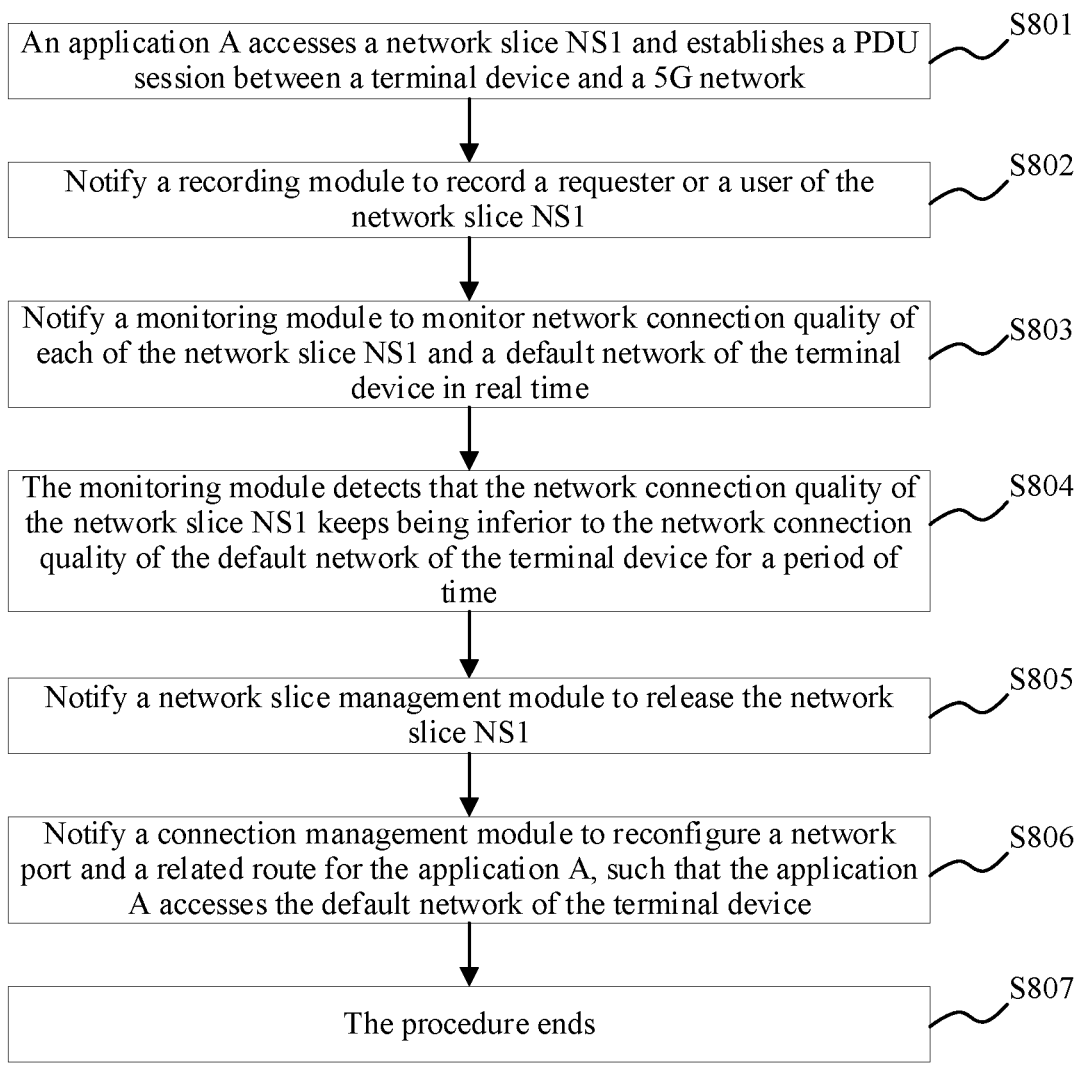
FIG. 9 is a flowchart of a network slice management method provided by another embodiment of the present disclosure.

FIG. 9 is a flowchart of a network slice management method directed at network connection quality provided by another specific example of the present disclosure. The network slice management method is used in a terminal device, and the network slice management method includes the following steps.

At step S801, an application A accesses a network slice NS1 and establishes a PDU session between the terminal device and a 5G network.

At step S802, a recording module is notified to record a requester or a user of the network slice NS1.

At step S803, a monitoring module is notified to monitor network connection quality of each of the network slice NS1 and a default network of the terminal device in real time.

At step S804, the monitoring module detects that the network connection quality of the network slice NS1 keeps being inferior to the network connection quality of the default network of the terminal device for a period of time.

At step S805, a network slice management module is notified to release the network slice NS1.

At step S806, a connection management module is notified to reconfigure a network port and a related route for the application A, such that the application A accesses the default network of the terminal device.

At step S807, the procedure ends.

Example V

Figure 10:
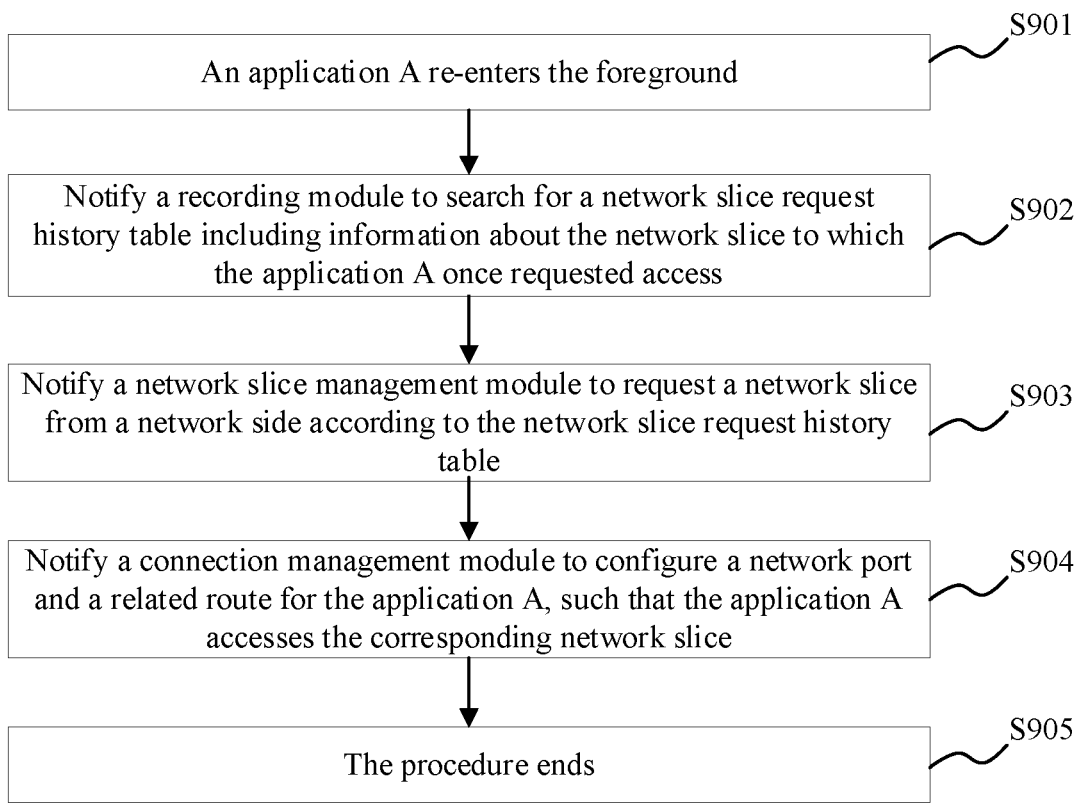
FIG. 10 is a flowchart of a network slice management method provided by another embodiment of the present disclosure.

FIG. 10 is a flowchart of a network slice management method for re-requesting access to a network slice for an application provided by another specific example of the present disclosure. The network slice management method is used in a terminal device, and the network slice management method includes the following steps.

At step S901, an application A re-enters the foreground.

At step S902, a recording module is notified to search for a network slice request history table including information about the network slice to which the application A once requested access.

At step S903, a network slice management module is notified to request a network slice from a network side according to the network slice request history table.

At step S904, a connection management module is notified to configure a network port and a related route for the application A, such that the application A accesses the corresponding network slice.

At step S905, the procedure ends.

Further, an embodiment of the present disclosure also provides a terminal device including: a memory, a processor, and a computer program stored in the memory and executable by the processor.

The processor and the memory may be connected by a bus or by other means.

As a non-transitory computer-readable storage medium, the memory can be used to store a non-transitory software program and a non-transitory computer-executable program. In addition, the memory may include a high-speed random access memory and a non-transitory memory, for example, at least one magnetic disk storage device, a flash memory device, or another non-transitory solid-state storage device. In some embodiments, the memory may include memories remotely located with respect to the processor, and these remote memories may be connected to the processor via a network. Examples of the above-mentioned network include the Internet, an intranet, a local area network, a mobile communication network, and a combination thereof.

It should be noted that the terminal device in this embodiment may include the system architecture platform in the embodiment shown in FIG. 1. The terminal device in this embodiment and the system architecture platform in the embodiment shown in FIG. 1 are of the same inventive concept. Therefore, these embodiments have the same implementation principle and technical effects, and details will not be repeated herein.

The memory stores the non-transitory software program and instructions required for implementing the network slice management method of any of the embodiments, which, when executed by the processor, cause the processor to perform the network slice management method of any of the embodiments, for example, to perform the method steps S100 to S300 in FIG. 2, method step S210 in FIG. 3, method steps S211 to S213 in FIG. 4, method steps S410 to S420 in FIG. 5, method steps S501 to S510 in FIG. 6, method steps S601 to S611 in FIG. 7, method steps S701 to S707 in FIG. 8, method steps S801 to S807 in FIG. 9, and method steps S901 to S905 in FIG. 10.

The apparatus embodiments described above are only for illustration. The units described as separate components may or may not be physically separated, that is, they may be located at one place or distributed to multiple network units. Some or all of the modules can be selected according to actual needs to achieve the purpose of this embodiment.

Furthermore, an embodiment of the present disclosure also provides a non-transitory computer-readable storage medium storing computer-executable instructions, which, when executed by a processor or a controller, for example, by the processor of the terminal device in any of the above-described embodiments, cause the processor or controller to perform the network slice management method in any of the above-described embodiments, for example, to perform the method steps S100 to S300 in FIG. 2, method step S210 in FIG. 3, method steps S211 to S213 in FIG. 4, method steps S410 to S420 in FIG. 5, method steps S501 to S510 in FIG. 6, method steps S601 to S611 in FIG. 7, method steps S701 to S707 in FIG. 8, method steps S801 to S807 in FIG. 9, and method steps S901 to S905 in FIG. 10.

The embodiments of the present disclosure include the following technical scheme. A terminal device acquires operation information of the terminal device, determines, according to the operation information of the terminal device and from among network slices accessed by applications on the terminal device, a network slice to be released, and then releases the network slice to be released. According to the scheme provided by the embodiment of the present disclosure, the operation information of the terminal device can be acquired and monitored, for example, by monitoring related information such as an operation status of applications on the terminal device, a system operation status of the terminal device, and network connection quality of the terminal device. A network slice to be released can be determined, according to a working condition of the terminal device indicated by the operation information of the terminal device, from among the network slices accessed by the applications on the terminal device, for example, a network slice accessed by an application currently not used by a user can be determined as a network slice to be released. Then, the network slice to be released is released, so that the application which is not used by the user currently is prevented from still accessing the network slice, thereby avoiding extra costs in the case of a time-based charge with the network slice, and improving user experience.

It can be understood by those of ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

The above is a detailed description of some embodiments of the present disclosure, but the present disclosure is not limited to the above-mentioned embodiments. Those of ordinary skill in the art can also make various equivalent modifications or replacements without departing from the scope of the present disclosure, and these equivalent modifications or replacements are all included in the scope defined by the claims of the present disclosure.

What is claimed is:

1. A network slice management method, comprising:
acquiring operation information of a terminal device;
wherein the operation information comprises an application operation status;
in response to the application operation status indicating that a corresponding application enters a background operation state or is in an abnormal operation state, and the corresponding application having been in the background operation state or the abnormal operation state for a duration, determining a network slice accessed by the corresponding application as the network slice to be released; and releasing by the terminal device the network slice to be released.

2. The method of claim 1, wherein determining the network slice accessed by the application as the network slice to be released comprises:

determining the network slice accessed by the application;

determining that the network slice is exclusively accessed by the application; and determining the network slice as the network slice to be released.

3. The method of claim 2, further comprising:

in response to the application exiting the background operation state or exiting the abnormal operation state, re-requesting accessing to the network slice for the application.

4. The method of claim 3, wherein re-requesting access to the network slice for the application comprises:

acquiring a network slice request history table of the application; and re-requesting accessing to the network slice for the application according to the network slice request history table.

5. A non-transitory computer-readable storage medium storing computer-executable instructions, wherein the computer-executable instructions are configured to implement the method as claimed in claim 1.

6. The method of claim 1, further comprising:

switching the corresponding application, which currently accesses the network slice to be released, to accessing a default network of the terminal device.

7. The method of claim 1, further comprising:

in response to the application exiting the background operation state or exiting the abnormal operation state, re-requesting accessing to the network slice for the application.

8. The method of claim 7, wherein re-requesting access to the network slice for the application comprises:

acquiring a network slice request history table of the application; and re-requesting accessing to the network slice for the application according to the network slice request history table.

9. A terminal device, comprising:

a memory, a processor, and a computer program stored in the memory and executable by the processor, wherein the processor, when executing the computer program, implements the method as claimed in claim 1.

10. A network slice management method, comprising:

acquiring operation information of a terminal device, wherein the operation information of the terminal device comprises a system operation status of the terminal device;

in response to the system operation status of the terminal device indicating that the terminal device enters a sleep mode, determining that all of the network slices accessed by the applications on the terminal device are network slices to be released; and releasing by the terminal device the network slice to be released.

11. The method of claim 10, further comprising:

switching the corresponding application, which currently accesses the network slice to be released, to accessing a default network that is supported by the terminal device.

12. A terminal device, comprising:

a memory, a processor, and a computer program stored in the memory and executable by the processor, wherein the processor, when executing the computer program, implements the method as claimed in claim 10.

13. A non-transitory computer-readable storage medium storing computer-executable instructions, wherein the computer-executable instructions are configured to implement the method as claimed in claim 10.

14. A network slice management method, comprising:

acquiring operation information of a terminal device, wherein the operation information of the terminal device comprises first network quality information corresponding to a network slice of an accessed network and second network quality information corresponding to a default network that is supported by the terminal device;

in response to the second network quality information being superior to the first network quality information for a duration, determining, the network slice corresponding to the first network quality information as a network slice to be released; and releasing by the terminal device the network slice to be released;

wherein, each of the first network quality information and the second network quality information comprises at least one of latency, reliability, or data rate.

15. The method of claim 14, further comprising:

switching the corresponding application, which currently accesses the network slice to be released, to accessing a default network that is supported by the terminal device.

16. A terminal device, comprising:

a memory, a processor, and a computer program stored in the memory and executable by the processor, wherein the processor, when executing the computer program, implements the method as claimed in claim 14.

17. A non-transitory computer-readable storage medium storing computer-executable instructions, wherein the computer-executable instructions are configured to implement the method as claimed in claim 14.

* * * * *